Aug. 14, 1962  W. G. RORK ET AL  3,048,997
ANGULAR ACCELEROMETER CALIBRATOR
Filed Feb. 12, 1960  2 Sheets-Sheet 1

INVENTORS
WALLACE G. RORK
JAMES I. GARNER
BY Wade County
ATTORNEY
Arthur R. Parker
AGENT

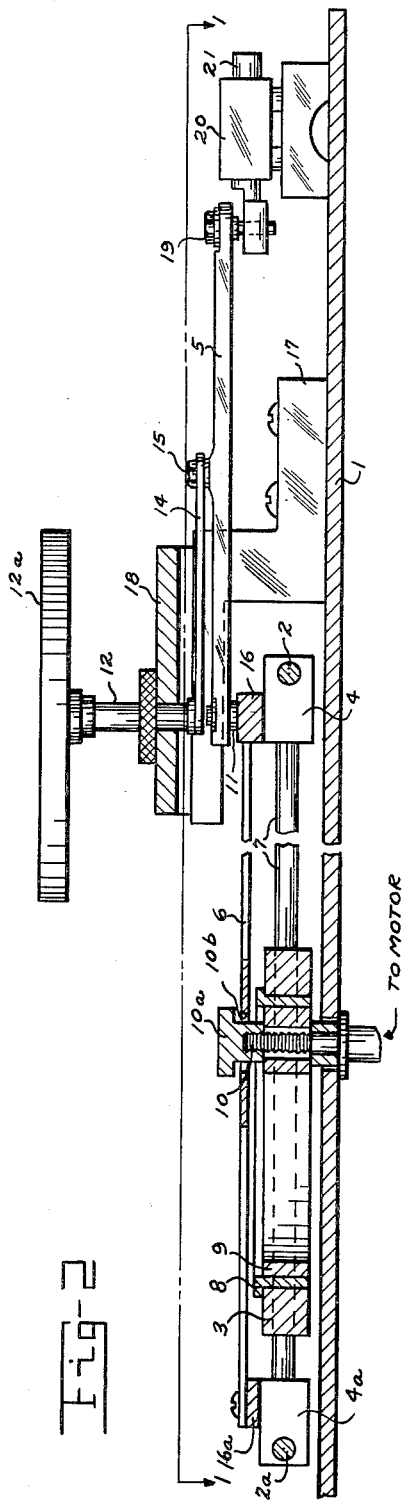

3,048,997
ANGULAR ACCELEROMETER CALIBRATOR
Wallace G. Rork, Springfield, and James I. Garner, Blanchester, Ohio, assignors to the United States of America as represented by the Secretary of the Air Force
Filed Feb. 12, 1960, Ser. No. 8,467
9 Claims. (Cl. 73—1)
(Granted under Title 35, U.S. Code (1952), sec. 266)

The invention described herein may be manufactured and used by or for the United States Government for governmental purposes without payment to us of any royalty thereon.

This invention relates generally to angular accelerometers and, more particular, to a novel manner of calibrating angular accelerometers. In the testing and research of accelerometers, two main types have been investigated, namely, the linear and the angular accelerometers. Angular accelerometers are frequently used in the flight test of various weapons systems in order to accurately measure acceleration of the angular motion of rigid bodies. Naturally, it is of the utmost importance that such accelerometers be extremely accurate and easily calibrated. Accordingly, the need exists for some simple means for facilitating the calibration of such accelerometers.

Previous types of accelerometer calibrators incorporated a rack and pinion arrangement or the like resulting in a disadvantageous gear backlash and/or chatter, whereas the angular accelerometer calibrator of the present invention represents an improved and novel means for facilitating a direct method of calibration.

An object of the present invention, therefore, resides in the provision of an angular accelerometer calibrator that eliminates both gear backlash and chatter.

Another object of the invention utilizes a calibrator mechanism easily adaptable to handling angular accelerometers in large packages.

A further object of the invention resides in an improved calibrator mechanism for accurately calibrating accelerometers prior to their use in flight tests.

A still further object of the invention involves a new and unusual calibrator device facilitating the rapid calibration of a plurality of angular accelerometers and yet incorporating a simple and novel arrangement involving a minimum of point contacts and moving parts.

Other objects and advantages of the invention will become apparent from the following description, taken in connection with the accompanying drawings, in which like reference numerals refer to like parts in the several figures.

FIG. 2 is a second somewhat partially broken away view taken about on section 2—2 of the calibrator mechanism of FIG. 1, illustrating additional details of the operating mechanism thereof with the mounting plate and instrument mounting table in position thereon.

Figure 1:
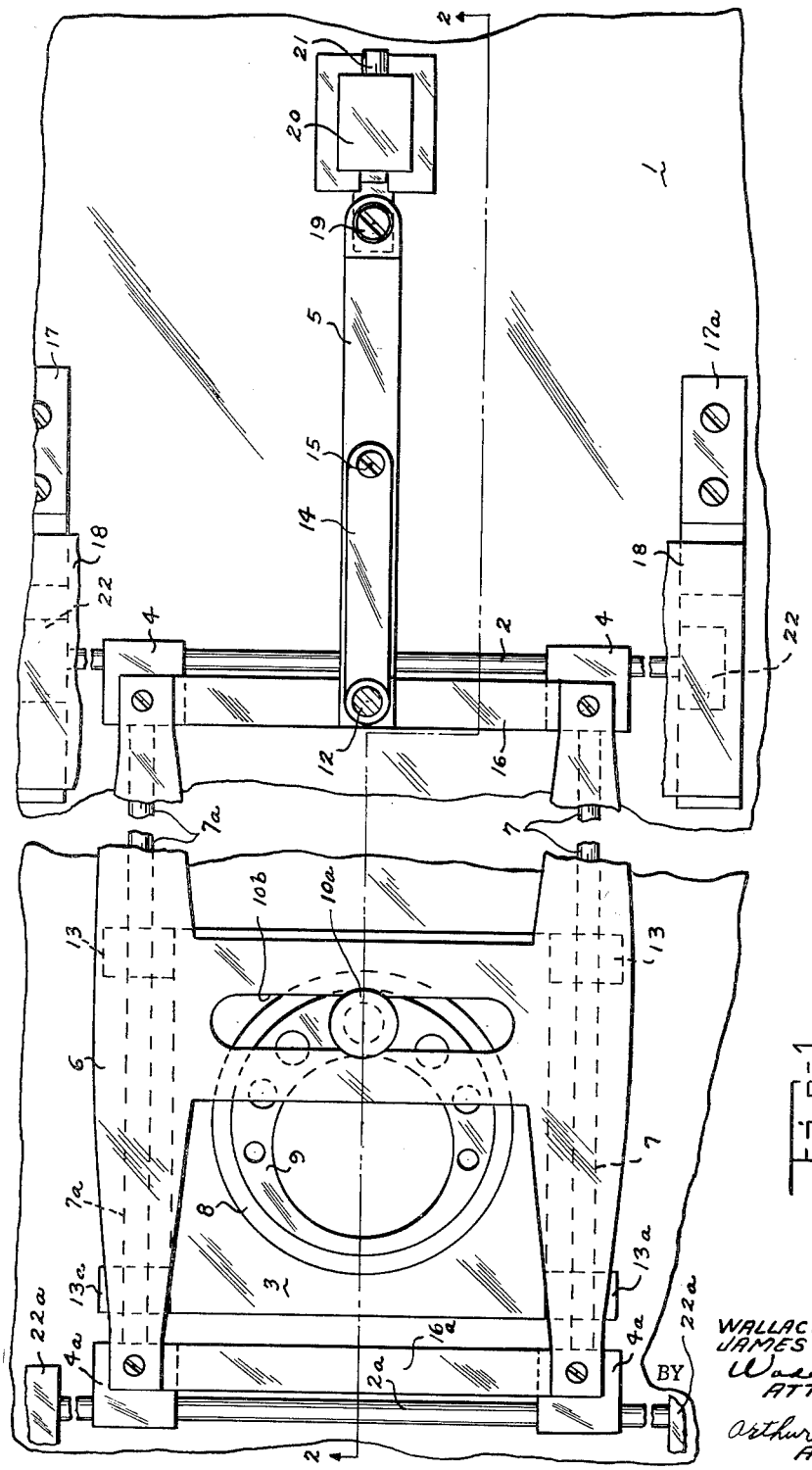
FIG. 1 is a somewhat partially broken away plan view of the calibrator of the present invention taken about on section 1—1 of FIG. 2, illustrating details of the eccentrically driven mechanism thereof with the mounting plate and instrument mounting table omitted.

Referring specifically to FIG. 1 of the drawings, the calibrator of the present invention consists in a mounting plate 1, a pair of separated, parallel relatively elongated rods 2 and 2a, a pair of brackets 22 and 22a positioned on said mounting plate 1 and mounting, respectively, the opposite ends of each of said pair of rods 2 and 2a, a pair of carriers 4 and 4a slidably mounted on each of said pair of rods 2 and 2a for movement back and forth thereon, a pair of bracing members 16 and 16a between said carriers 4 and 4a, an eccentric block 3 having a plurality of carriers 13 and 13a, respectively, integrally formed on opposite sides thereof, and a pair of parallel rods 7 and 7a rigidly formed between said carriers 4, 4a adjacent opposite sides of eccentric block 3 and extending at right angles to rods 2, 2a in slidable, mounting engagement with said plurality of carriers 13, 13a. Said eccentric block 3 incorporates an enlarged opening in which opening is mounted the bearing 8 in which bearing 8 the eccentric 9 rotates about the screw-threaded rotating member 10 (note FIG. 2). Said screw-threaded rotating member 10 is adapted to be rotated by any suitable motor (not shown) and power is transferred therefrom to the eccentric 9 by means of the screw cap 10a which screw cap 10a is tightly fastened and placed on the screw-threaded portion of member 10 in tight engagement with the upper surface of said eccentric 9 to rotate with said screw-threaded rotating member 10. It is noted that the previously mentioned bracing members 16, 16a form part of a top brace 6 which top brace 6 is clearly shown in said FIG. 1 as incorporating an elongated open slot 10b which provides appropriate space for the screw cap 10a extending therethrough.

Thus, on rotation of the screw-threaded rotating member 10, the eccentric 9 is eccentrically rotated about said member 10 in the bearing 8 by means of the screw cap 10a as indicated above. This eccentric rotation of eccentric 9 initially imparts slidable or back and forth, straight-line movement to eccentric block 3 and its carriers 13, 13a relative to the rods 7 and 7a and, in addition, through engagement between carriers 13, 13a and rods 7, 7a imparts movement to said rods 7 and 7a and the carriers 4 and 4a affixed thereto at right angles to said initial movement. Movement of said carriers 4 and 4a and the bracing members 16 and 16a affixed thereto in a straight-line direction is for a purpose to be hereinafter explained in detail.

With particular reference to FIG. 2 of the drawings, it is seen that a relatively elongated link 5 is pivoted at one end thereof to the bracing member 16 by means of the pivot indicated at 11. As clearly seen in FIGS. 1 and 2 of the drawings, said link 5 is pivoted at the other end thereof to one end of a slide 21 by means of a pivot 19 which slide 21 is mounted for slidable, straight-line movement in the guide 20 rigidly positioned as shown on the mounting plate 1. A pair of brackets 17 and 17a are likewise rigidly positioned on said mounting plate 1 in spaced relation near opposite sides thereof for the purpose of supporting the table mounting plate 18 on which mounting plate 18 the instrument mounting table 12a is rotatably mounted by means of the shaft 12. As seen clearly in said FIG. 2 of the drawings, said shaft 12 extends through said mounting plate 18 to fixedly support table 12a at the upper end thereof, and on the lower end thereof is fixedly engaged with one end of a relatively short link 14, the other end of which link 14 is pivotally engaged with the midpoint of the link 5 by means of the center pivot 15. It is noted that the relatively short link 14 is exactly one-half the length of the link 5. Thus, movement of the link 14 by means of the link 5 effects angular oscillation of the table 12a since its shaft 12 is fixed in place by means of the mounting plate 18.

To summarize the operation of the calibrator mechanism of the instant invention, the eccentric 9 is driven by means of the rotating member 10 to impart sliding, or back-and-forth movement to the eccentric block 3 which, in turn, effects slidable or back-and-forth movement to the top brace 6 at right angles thereto. Said top brace 6 is connected to the link 5 through bracing member 16 and by means of the pivot 11, and the straight-line or back-and-forth motion imparted thereto is imparted to the slide 21 through means of the pivot 19. A second link 14 is pivoted to the center of link 5 by means of pivot 15 at one end thereof and is connected to the shaft 12 at the other end thereof, which shaft 12 centrally mounts the instrument mounting table 12a and is held in fixed position by means of the mounting plate 18 mounted on the brackets 17 and 17a. Thus, when the link 5 is initially moved as hereinbefore explained to cause movement of the link 14, the table 12a on which the angular accelerometer to be calibrated is mounted is angularly oscillated about its shaft 12 in a uniform, symmetrical motion. In this way, the angular accelerometer to be calibrated is mounted on the table 12a prior to its installation in the aircraft to be flight tested. Furthermore, it is noted that the distance between the centers of the pivots 12 and 15 on the link 14 is exactly one-half of the distance between the centers 11 and 19 on the link 5 and is equal to the distance between the centers of pivots 11 and 15, and 15 and 19 on the link 5. This precise distance is, of course, necessary in order to impart even angular oscillating movement to the table 12a in both directions of rotation.

Thus, a new and improved calibrator mechanism has been developed for converting rotary motion to angular, continuous oscillating motion of a uniform symmetrical nature for use in calibrating angular accelerometers. Moreover, the present invention utilizes a unique calibrator which facilitates the accurate calibration of a plurality of various types of angular accelerometers prior to their utilization in various flight tests of various weapons systems.

We claim:

1. In an angular accelerometer calibrator, means for converting rotary motion to angular oscillating motion comprising a main mounting plate, a pair of spaced, parallel rods fixedly mounted on said main mounting plate, a pair of spaced carriers slidably mounted on each pair of rods, a pair of bracing members rigidly positioned between a respective pair of said spaced carriers, a top brace rigidly positioned in rigid, contacting relation on said bracing members adjacent to said carriers, having a centrally disposed elongated slot, a second pair of spaced, parallel rods extending between and rigidly affixed to a respective pair of said carriers at right angles to said first-named pair of rods, an eccentric block positioned between said top brace and said main mounting plate having a second pair of carriers integrally formed therewith in spaced relation on opposite sides thereof in slidable engagement with said second pair of rods, an enlarged opening incorporated therein, a bearing member circumferentially disposed within said enlarged opening and an eccentric mounted for rotation in said opening in contact with said bearing, a rotatably mounted member positioned within an eccentrically disposed opening extending through said eccentric and adapted to be rotated by a motor, a screw cap in engagement with said rotatably mounted member and extending through the top surface of said eccentric and extending through the centrally disposed, elongated slot of said top brace, a relatively elongated link pivoted at one end thereof to said top brace, a slide mounted for slidable straight-line movement and pivoted to the other end of said elongated link, a second relatively short link pivoted at one end to said elongated link, and a load-supporting shaft adapted for supporting an instrument mounting table and rotatably held in position and fixed to the other end of said short link for rotation therewith by said first and second links.

2. Means for calibrating angular accelerometers comprising a first yoke-type member slidably mounted for back-and-forth movement in one plane, a second eccentrically driven yoke-type member mounted for slidable, eccentric movement relative to said first yoke-type member, means between said first and second yoke-type members for translating the eccentric movement of said second yoke-type member into straight-line movement of said first yoke-type member, and link means attached to said first yoke-type member for translating the straight-line movement of said first yoke-type member into angular oscillatory movement, said first-named means comprising a pair of elongated spaced rods extending parallel to each other and attached to said first yoke-type member, and a plurality of carriers integrally formed on said second yoke-type member in slidable engagement with said pair of parallel-extending rods for eccentrically translating straight-line movement to said first yoke-type member, said link means comprising a first link pivotally attached at one end to said first yoke-type member at an intermediate portion thereof and constrained for straight-line movement at the other end, and a second link intermediately pivoted to said first link at one end thereof and extending for one-half the length of said first link to a fixed attachment with a rotatably mounted shaft at the other end thereof, said shaft being adapted for mounting an instrument-supporting table thereon for uniform angular oscillation therewith on movement of said first and second links by said eccentrically driven yoke-type member, said link means comprising a first link pivotally attached at one end to said first yoke-type member at an intermediate portion thereof and constrained for straight-line movement at the other end thereof, and a second link intermediately pivoted to said first link at one end thereof and extending for one-half the length of said first link to a fixed attachment with a rotatably mounted shaft at the other end thereof, and an instrument-mounting table fixed to said shaft for uniform angular oscillation therewith on movement of said first and second links by said eccentrically driven yoke-type member.

3. Means for calibrating angular accelerometers comprising a first yoke-type slide mounted for slidable movement in one plane, a second yoke-type slide mounted for movement in a second plane at right angles to said first yoke-type slide and slidably attached thereto, a third slide constrained for reciprocatory, straight-line movement attached at one end to said second slide, interconnecting element means between said second and third slides transmitting straight-line motion therebetween on movement of said first slide, rotatable shaft means interconnected with said third slide and adapted for connection with a rotatably mounted table adapted to support an angular accelerometer thereon, and an eccentric member incorporated in said first slide and having an eccentrically disposed drive shaft adapted to be driven by a motor and screw cap means disposed between said drive shaft and said eccentric member to drive said eccentric member and said second slide therewith to reciprocate said third slide and the interconnecting element and rotatable shaft means connected therewith.

4. Means for calibrating angular accelerometers as in claim 3, said interconnecting element means comprising an elongated first link attached between said second slide in offset relation to said drive shaft at one end thereof and to said third slide at the other end thereof and a second relatively short link attached at one end to said rotatable shaft means and intermediately attached at the other end thereof to said first link to effect uniform, angular oscillation to said shaft means.

5. Means for calibrating angular accelerometers as in claim 3, said interconnecting element means including a straight-line link system comprising a first relatively elongated link member centrally pivoted at one end thereof to said second slide member and at the other end thereof to said third slide member for straight-line movement with said third slide member and a second relatively short link having one end pivoted to said first link member intermediately thereof and the other end thereof fixed to said rotatable shaft means adapted for fixed attachment to the rotatably mounted table and retained in fixed position substantially over said first link member.

6. Mechanism for accurately calibrating angular accelerometers adapted for positioning on a rotatably mounted member, main shaft means adapted to mount the rotatably mounted member in fixed relation thereon, and rotary drive means for continuously oscillating said main shaft means at a uniform, symmetrical rate comprising a first slidably mounted member restrained for straight-line movement, a second slidably mounted member restrained for straight-line movement at right angles to said first member, first interconnecting means between said first and second slidably mounted members, second interconnecting means between said first interconnecting means and said main shaft means and eccentric drive means incorporated in said second slidably mounted member for eccentrically rotating said second slidably mounted member and reciprocating said first slidably mounted member in a straight-line direction to actuate said second interconnecting means and the main shaft means interconnected therewith.

7. Mechanism for accurately calibrating angular accelerometers as in claim 6, said first and second slidably mounted members each incorporating a plurality of spaced carriers slidably engaged with a respective pair of parallel extending rods with the rods of one of said slidably mounted members extending at right angles to and in fixed engagement with the rods of said other slidably mounted member.

8. Mechanism for accurately calibrating angular accelerometers as in claim 6, said eccentric drive means comprising a slide member having a relatively large central opening positioned in driving engagement with said second slidably mounted member, and an eccentric member positioned in the central opening of said slide member for eccentrically driving said slide member and said second slidably mounted member.

9. Mechanism for accurately calibrating angular accelerometers as in claim 6, said second slidably mounted member consisting of a yoke member and said eccentric drive means comprising an eccentric block mounted within said yoke member, an eccentric rotatably mounted within said eccentric block, a drive shaft keyed through said eccentric and adapted to be driven by a motor, and a screw cap member in tight engagement with said drive shaft and said eccentric to rotate therewith on operation of said eccentric drive means.

References Cited in the file of this patent

UNITED STATES PATENTS

| 149,696 | Vivian et al. | Apr. 14, 1874 |
| 734,595 | Olin | July 28, 1903 |
| 1,716,788 | Miller | June 11, 1929 |
| 2,827,790 | Brown | Mar. 25, 1958 |

FOREIGN PATENTS

| 864,184 | Germany | Jan. 22, 1953 |